United States Patent [19]

Ort

[11] 4,101,517

[45] Jul. 18, 1978

[54] PREPARATION OF POLYESTERS OF 1,2-BIS(HYDROXYPHENYL)ETHANES AND AROMATIC DICARBOXYLIC ACIDS

[75] Inventor: Morris R. Ort, Wilbraham, Mass.

[73] Assignee: Monsanto Company, St. Louis, Mo.

[21] Appl. No.: 770,955

[22] Filed: Feb. 22, 1977

[51] Int. Cl.$^2$ .............................................. C08G 63/18
[52] U.S. Cl. .................................................... 528/271
[58] Field of Search ................................ 260/47 C, 49

[56] References Cited

U.S. PATENT DOCUMENTS

| | | | |
|---|---|---|---|
| 3,351,611 | 11/1967 | Conix | 260/47 |
| 3,702,838 | 11/1972 | Wilson | 260/47 C |
| 3,824,213 | 7/1974 | Stackman | 260/47 C |

*Primary Examiner*—Lester L. Lee
*Attorney, Agent, or Firm*—R. Bruce Blance; William J. Farrington; James C. Logomasini

[57] ABSTRACT

A process for the preparation of polyarylene esters from aromatic dicarboxylic acids and diesters of a diphenol admixture containing 1,2-bis(4-hydroxyphenyl)ethane. The polymerization process is catalyzed by a potassium compound and yields polymer of improved color and fire safety performance.

7 Claims, No Drawings

PREPARATION OF POLYESTERS OF 1,2-BIS(HYDROXYPHENYL)ETHANES AND AROMATIC DICARBOXYLIC ACIDS

FIELD OF THE INVENTION

This invention relates to a process of preparing polyarylene esters of aromatic dicarboxylic acids and 1,2-bis(4-hydroxyphenyl)ethane of improved color and fire safety performance. In one aspect it relates to catalysis of the condensation of 1,2-bis(4-acyloxyphenyl)ethane and aromatic dicarboxylic acids by means of a potassium compound.

DESCRIPTION OF THE PRIOR ART

Polyesters obtained by the condensation of 1,2-bis-(hydroxyphenyl)ethane and aromatic dicarboxylic acids have been disclosed recently and have been shown to possess improved fire safety performance in comparison with analogous polyesters prepared from bisphenols such as bisphenol A. Thus the 1,2-bis-(hydroxyphenyl)ethane polyesters achieve a fire rating of V-O when they are subjected to the UL-94 test even in very thin samples of 0.08 cm and less.

The polyesters may be prepared by the condensation of 1,2-bis(4-acyloxyphenyl)ethane and aromatic acids by melt polymerization or by melt polymerization to form a prepolymer which is subsequently polymerized in the solid state. The polymerization tends to be slow and to yield polymer with undesirable color. Catalysis of the polymerization has been achieved with sodium carbonate and sodium salts of the lower fatty acids. However, the polymer products exhibit undesirably long period of after glow when they are subjected to flaming combustion and the ignition source is removed.

SUMMARY OF THE INVENTION

According to the present invention, polyarylene esters of 1,2-bis(4-hydroxyphenyl)ethane of good color and improved afterglow are produced by a process which comprises the condensation of a 1,2-bis(4-acyloxyphenyl)ethane wherein the acyl group contains from 1 to 7 carbon atoms and an aromatic dicarboxylic acid in the presence of a potassium compound selected from the group consisting of potassium hydroxide, potassium carbonate, potassium bicarbonate and the potassium salts of the lower fatty acids comprising 1 to 7 carbon atoms.

THE PREFERRED EMBODIMENTS

The polyarylene esters prepared by the process of the present invention can be prepared from any suitable aromatic dicarboxylic acid and admixtures thereof. The preferred acids include isophthalic acid, terephthalic acid, bis(4-carboxyphenyl) ether, bis(4-carboxyphenyl)sulfone, bis(4-carboxyphenyl)methane, and 1,2-bis(4-carboxyphenyl)ethane. A particularly preferred aromatic dicarboxylic acid is isophthalic acid and combinations thereof. Mixtures of one or more of the aromatic diacids with minor quantities, generally less than about 25 mol percent, of $C_2$ to $C_{20}$ aliphatic diacids can also be used. The quantities of aliphatic diacids in general are selected to impart improved processability to the polyarylene ester without significant loss in Tg. Preferably the quantity is limited to a loss in Tg of not more than 10° C.

The acid or admixture of acids is combined with 1,2-bis-(4-hydroxyphenyl)ethane or with 1,2-bis(4-hydroxyphenyl)ethane in admixture with essentially any other suitable diphenol or mixture of diphenols to provide polyarylene esters possessing useful glass transition temperatures and melting points. The preferred diphenols comprise at least one diphenol selected from the group consisting of 1,2-bis(3-hydroxyphenyl)ethane, 1-(3-hydroxyphenyl)-2-(4-hydroxyphenyl)ethane, bis(4-hydroxyphenyl) methane, 2,2-bis(4-hydroxyphenyl)propane, bis(4-hydroxyphenyl) ether, and bis(4-hydroxyphenyl)sulfone. In preferred combinations, at least 75 mol percent of the diphenol moiety is 1,2-bis(4-hydroxyphenyl)ethane and the resulting polyester is preferably crystalline. More preferably, at least 90 mol percent and even more preferably 95 to 100 mol percent of the diphenol moiety is 1,2-bis(4-hydroxyphenyl)ethane. The more preferred combinations of dicarboxylic acid and diphenol contain isophthalic acid as the major component of the acid moiety. One of the more preferred combinations is obtained from isophthalic acid and 1,2-bis(4-hydroxyphenyl)ethane without additional components.

The polyesters can be produced by any convenient method such as by melt condensation or solvent condensation of mixtures of aromatic dicarboxylic acids and diphenol diesters selected to provide the desired fire safety performance and processability. A preferred method of preparation is the melt condensation of mixtures or aromatic dicarboxylic acids and diphenol diesters or melt condensation to an inherent viscosity of about 0.3 followed by solid state polymerization.

A suitable process for the production of the polyesters comprises reacting a mixture of a 1-7 carbon aliphatic monocarboxylic acid diester of the diphenol or diphenol mixture with at least one aromatic dicarboxylic acid in the melt phase in the presence of a catalytic amount of a potassium compound selected from the group consisting of potassium hydroxide, potassium carbonate, potassium bicarbonate and the potassium salts of the lower fatty acids containing from 1 to 7 carbon atoms. The reaction is carried out under an inert atmosphere substantially free of oxygen and water vapor and under such conditions of temperature and pressure that the 1-7 carbon aliphatic monocarboxylic acid produced during the reaction is removed from the reaction mixture by distillation. The diphenol diesters useful in this melt condensation process are derived from the relatively low-boiling monocarboxylic 1-7 carbon atom acids, such as formic, acetic, propionic, butyric, pentanoic, hexanoic or heptanoic acids, or mixtures thereof, the most preferred being acetic acid. The potassium salt of the lower fatty acids can be selected to contain the same acid as the diester. The preferred potassium salts are potassium acetate, and potassium carbonate. In more detail the melt polycondensation stage conveniently comprises contacting a mixture of the 1-7 carbon atom aliphatic carboxylic acid esters of the diphenols with the aromatic dicarboxylic acid mixture such that the reactants are in substantially stoichiometric proportions up to 10 molar percent excess of the diester or the diacid in the presence of from about 0.002 to about 0.08 equivalent potassium ion per equivalent of the diphenol diester. The reaction temperature is usually from 240° to 350° C. and the pressure is atmospheric or lower. Commonly the reaction is conducted under an inert atmosphere and in the initial phase at atmospheric pressure and subsequently at a higher temperature and at lower pressure or at a series of lower pressures until essentially all of the 1-7 carbon atom aliphatic carboxylic acid has been removed by distillation and the polyester product has achieved a high molecular weight. For adequate strength in the polyester, the molecular weight of the polyester is preferably sufficient to provide an inherent viscosity of at least about 0.3. Further increase in the molecular weight beyond the level corresponding to an inherent viscosity of 0.3 can be achieved by further melt condensation or by solid state polymerization. The rate of polymerization is conveniently determined by measuring the rate of evolution of lower fatty acid which is distilled from the reaction mixture and is expressed as the average number of milliliters evolved per molecule of diphenol diester per minute.

The fire safety performance of a polymer is manifested in several ways including the flame resistance or resistance to ignition and propagation of flame, the degree of smoke generation on combustion and the evolution of toxic gases on combustion. A polymer of improved fire safety performance is one which is difficult to ignite, does not readily propagate a flame, generates little smoke on combustion and evolves little of the more noxious gases containing nitrogen, sulfur, phosphorus or halogen which are very frequently a product of combustion of conventional flame retardant materials. Flame resistance is conveniently determined by the Underwriter's Laboratory "Test for Flammability of Plastic Materials — UL-94, Sept. 17, 1973" using the ratings which became effective Feb. 1, 1974. Test samples conforming to specified dimensional limits are ignited, after which the igniting flame is removed and the time required for both the flame and any subsequent glowing to extinguish themselves is measured. The samples are classified in order of decreasing flammability as V-II, V-I or V-O, depending upon the burning and/or glowing time and whether or not the molten drippings from the sample will ignite cotton fibers placed below the sample. A rating of V-II indicates only that the solid polymer is self-extinguishing within an average time of 25 seconds, based on five trials, following removal of the igniting flame. The molten material which drips from the flaming sample may ignite untreated cotton fibers placed 12 inches (30 cm.) below the test sample. Samples which qualify as V-I are self-extinguishing within an average time of 25 seconds following removal of the igniting flame and do not drip flaming molten material that ignites cotton placed 30 cm. below the test sample. Any localized glowing must cease within 60 seconds after second removal of the test flame, not travel up the holding clamp and be incapable of igniting surgical cotton. If the other V-I requirements are met, the flame is extinguished within an average of 5 seconds following ignition, no flaming particles are present, and glowing ceases within 30 seconds after the second removal of the test flame, the samples are rated V-O. The appropriate Underwriter's Laboratory publications should be consulted for a more complete description of the rating system employed for the UL-94 test procedure. However, these numerical flame spread ratings are not intended to reflect hazards presented by such materials under actual fire conditions. Test samples are 15 cm. × 1.3 cm. and of three thicknesses approximately 0.32 cm., 0.16 cm. and 0.08 cm. and are held in a vertical position during test. The minimum sample thickness for a V-O or a V-I rating is determined in the test.

The 1,2-bis(hydroxyphenyl)ethane polyesters and copolyesters produced by the method of the present invention are useful in many forms and can be shaped in many ways to produce useful objects. They can be cast into films of high strength either from the melt or from solution in suitable solvents such as mixtures of phenol and tetrachloroethane. Those which can be oriented under stress can be melt spun and drawn into fibers of good strength. They are very useful as molding resins for the production of molded articles. The novel polyesters are comminuted into powders or extruded and pelletized and the powders or pellets can be molded by extrusion into bar or rod form. They may be injection molded into any desired shape by conventional molding equipment and machines.

The polyesters and copolyesters, in which, the 1,2-bis-(hydroxyphenyl)ethane is in the range of about 90 to about 100 mol percent of the diphenol moiety, possess melting points, usually in the range of 250°–320° C. and a high glass transition temperature or $T_g$ in the range of about 110° to 180° C. These properties confer high heat distortion temperature and creep resistance on the various shapes molded from these polyesters.

This invention is further illustrated but is not intended to be limited by the following examples in which ratios of monomers are mol ratios and all other parts and percentages are by weight unless otherwise specified.

The Examples illustrate the preparation of 1,2-bis-(hydroxyphenyl)ethane polyesters by the method of this invention and the improved color and reduced afterglow obtained with such products. Inherent viscosities are determined at 25° C. at a concentration of 0.5 g. per 100 ml. in a mixed solvent system of phenol and sym-tetrachloroethane in the weight ratio of 60:40. The fire safety performance of the polymers is determined by the methods described above.

EXAMPLE 1

PREPARATION OF POLY(1,2-BIS(4-HYDROXYPHENYL)ETHANE ISOPHTHALATE

A charge consisting of 167 parts of isophthalic acid and 298 parts of 1,2-bis(acetoxyphenyl)ethane and 0.005 mols potassium carbonate per mol of 1,2-bis(acetoxyphenyl)ethane is placed in a reaction vessel equipped with a stirrer, condenser and receiver. The vessel is evacuated and purged with nitrogen three times. During the reaction a nitrogen blanket is maintained in the reactor. The temperature is raised to about 245° C. and acetic acid distills. The rate of distillation during the initial 67 percent of reaction is 1.82 ml mol$^{-1}$ min.$^{-1}$. The distillation rate tapers after 87 parts of acetic acid have distilled in 55 minutes. The temperature rises slowly to 270° C. during the initial stage. Thereupon the vessel is evacuated to a pressure of about 200 torr for about 5 minutes and the pressure is then slowly reduced to about 1 torr while the temperature is increased to about 290° C. When the amperage on the stirrer motor increases by 0.02 to 0.04 amps, the stirrer motor is switched off and the vacuum is released with nitrogen. A total of 112 parts of acetic acid (98 percent of theoretical) is collected. The rate of evolution of acetic acid during the vacuum stage is 1.67 ml mol$^{-1}$ min.$^{-1}$. The prepolymer is extruded from the vessel under slight nitrogen pressure and is reduced in a mill to a powder of particle size in the range of from 0.1 to 0.25 mm. The inherent viscosity of the prepolymer is 0.28. The prepolymer is off white in color.

The powder is charged to a reaction vessel which is then purged with nitrogen. The pressure is reduced to 0.1 to 0.2 torr and the temperature is raised to about 10° to 15° C. below the melting point of the polymer. Heating is continued for 6 hours to complete the solid state polymerization. The vessel is cooled and the polymer is discharged. The inherent viscosity of the polymer is 0.90. It melts at about 305° C.

EXAMPLE 2

Example 2 is carried out for comparative purposes and is not within the scope of the invention. It is a repeat of Example 1 with sodium carbonate in place of the potassium carbonate. The prepolymer is off white in color and has an inherent viscosity of 0.32. 113 Parts of acetic acid (99 percent theoretical) distills. The rate of acetic acid evolution in the two stages of prepolymer formation is 1.98 ml mol$^{-1}$ min.$^{-1}$ and 1.25 ml mol$^{-1}$ min.$^{-1}$ respectively, After solid state polymerization, a crystalline polymer of inherent viscosity 0.90 is obtained.

EXAMPLE 3

Example 3 is carried out for comparative purposes and is not within the scope of the invention. It is a repeat of Example 1 with lithium carbonate in place of potassium carbonate. 96 Parts of acetic acid (84 percent theoretical) distills. The rate of acetic acid evolution is 2.0 ml mol$^{-1}$ min.$^{-1}$. The prepolymer is amber in color and has an inherent viscosity of 0.22. The polymer obtained by solid state polymerization has an inherent viscosity of 0.88.

EXAMPLE 4

Example 4 is carried out for comparative purposes, repeating the process of Example 1 without potassium carbonate catalyst. Approximately 84 parts of acetic acid distills in the first stage of the reaction in 117 minutes. The rate of distillation is 0.77 ml mol$^{-1}$ min.$^{-1}$. The rate of distillation in the second or vacuum stage is 0.69 ml mol$^{-1}$ min.$^{-1}$, and a total of 111 parts of acetic acid (97 percent theoretical) is collected. The prepolymer is light amber in color and has an inherent viscosity of 0.29. The crystalline polymer obtained therefrom by solid state polymerization has an inherent viscosity of 0.87.

EXAMPLE 5

Example 4 is repeated. Approximately 84 parts of acetic acid distills in the first stage of the reaction in 90 minutes. The rate of distillation is 0.89 ml mol$^{-1}$ min.$^{-1}$. The rate of distillation in the vacuum stage is 0.60 ml mol$^{-1}$ min.$^{-1}$. A total of 112 parts of acetic acid (98 percent theoretical) is collected. The prepolymer is light amber in color and has an inherent viscosity of 0.28.

Polymerization data for Examples 1–5 are presented in Table 1.

TABLE I

POLYMERIZATION DATA

| Ex. | Catalyst | Rate of Acetic Acid Distillation Stage 1 ml/mol/min | Stage 2 ml/mol/min | Prepolymer Inherent Viscosity | Prepolymer Color |
|---|---|---|---|---|---|
| 1 | K$_2$CO | 1.82 | 1.67 | 0.28 | off white |
| 2 | Na$_2$CO$_3$ | 1.98 | 1.25 | 0.32 | off white |
| 3 | Li$_2$CO$_3$ | 2.00 | —* | 0.22 | amber |
| 4 | none | 0.77 | 0.69 | 0.29 | light amber |
| 5 | none | 0.89 | 0.60 | 0.28 | light amber |

*This prepolymer was made without a vacuum cycle.

Samples of the polymers of Examples 1, 2, 3 and 4 are molded in a thickness of 0.80 mm. The samples are then subjected to the UL-94 test and the average time of flame out and average time of afterglow is determined. The data are presented in Table 2 and demonstrate the much shorter period of afterglow of the polyesters of Example 1 containing potassium and Example 4 without catalyst compared with the polyesters of Examples 2 and 3 containing sodium and lithium, respectively.

TABLE II

COMPARISON OF POLYESTER PRODUCTS

| Ex. | Metal Ion | Sample Thickness mm. | Average Flame out Time, Second burn, secs. | Average After-Glow Time Secs. |
|---|---|---|---|---|
| 1 | Potassium | 0.80 | 6 | 1 |
| 2 | Sodium | 0.80 | 6 | 23 |
| 3 | Lithium | 0.80 | 4 | 8 |
| 4 | none | 0.80 | 6 | 0 |

What is claimed is:

1. In a process for preparation of a polyarylene ester condensate of an aromatic dicarboxylic acid and a diphenol admixture comprising at least 75 mol percent 1,2-bis(4-hydroxyphenyl)ethane by melt condensation of the aromatic dicarboxylic acid and the 1-7 carbon aliphatic carboxylic acid diester of the diphenol admixture in substantially stoichiometric proportions up to 10 molar percent excess of the diacid or the diester, at a temperature in the range of from 240° to 350° C. to yield a condensate of inherent viscosity of at least about 0.3 determined at 25° C. in a 60/40 weight mixture of phenol and sym-tetrachloroethane at a concentration of 0.5 g. per deciliter, the improvement which comprises carrying out the melt condensation in the presence of a catalytic amount of a potassium compound selected from the group consisting of potassium hydroxide, potassium carbonate and the potassium salts of lower fatty acids containing from 1 to 7 carbon atoms.

2. The process of claim 1 wherein the concentration of potassium compound is in the range of about 0.002 to about 0.08 equivalent potassium ion per equivalent of diphenol diester.

3. The process of claim 1 wherein the potassium compound is selected from the group consisting of potassium acetate and potassium carbonate.

4. The process of claim 1 wherein the aromatic dicarboxylic acid is selected from the group consisting of isophthalic acid, terephthalic acid, bis(4-carboxyphenyl)ether, bis(4-carboxyphenyl)sulfone, bis(4-carboxyphenyl)methane, and 1,2-bis(4-carboxyphenyl)ethane.

5. The process of claim 1 wherein the diphenol diester is a diacetate.

6. The process of claim 1 wherein the inherent viscosity is increased to at least about 0.5 by additional melt condensation or by solid state polymerization.

7. The process of claim 1, wherein the diphenol diester contains at least 75 mol percent of 1,2-bis(4-hydroxyphenyl)ethane diester in admixture with a diphenol diester wherein the diphenol is selected from the group consisting of 1,2-bis(3-hydroxyphenyl)ethane, 1-(3-hydroxyphenyl)-2-(4-hydroxyphenyl)ethane, bis(4-hydroxyphenyl)methane, 2,2-bis(4-hydroxyphenyl)propane, bis(4-hydroxyphenyl)ether and bis(4-hydroxyphenyl)sulfone.

* * * * *